United States Patent [19]

DeSieno

[11] Patent Number: 4,933,871
[45] Date of Patent: Jun. 12, 1990

[54] GRADED LEARNING DEVICE AND METHOD

[76] Inventor: Duane DeSieno, 2015 Olite Ct., La Jolla, Calif. 92037

[21] Appl. No.: 287,877

[22] Filed: Dec. 21, 1988

[51] Int. Cl.$^5$ ............................................. G06F 15/18
[52] U.S. Cl. ..................................... 364/513; 364/200; 364/276.6
[58] Field of Search ............... 364/513, 807, 300, 200; 307/201

[56] References Cited

U.S. PATENT DOCUMENTS 4,760,604  7/1988  Cooper et al. ........................ 382/15

OTHER PUBLICATIONS

S. F. Shapiro, Robotic Systems Learn Through Experience, Computer Design, Nov. 1, 1988, pp. 54–68.

T. Inglesby, No Clowning Around, Neural Networks Can Help Manufacturing, Manufacturing Systems, Oct.- 1988, pp. 26–31.

H. H. Szu and R. L. Hartley, Nonconvex Optimization by Fast Simulated Annealing, vol. 75, No. 11, Proceedings of the IEEE 11, Nov. 1987, pp. 1538–1540.

H. Szu and R. Hartley, Fast Simulated Annealing, vol. 122, No. 3 & 4, Physics Letters A, Jun. 8, 1987, pp. 157–162.

D. H. Ackley, Stochastic Iterated Genetic Hillclimbing, Carnegie Mellon University Dissertation, CMU-CS-87-107, Mar. 1987, pp. 1–213.

G. E. Hinton, et al., Boltzman Machines: Constraint Satisfaction Networks that Learn, Carnegie Mellon University Technical Report, CMU-CS-84-119, May 1984, pp. 1–42.

A. G. Barto, et al., Neuronlike Adaptive Elements that Can Solve Difficult Learning Control Problems, vol. SCM-13, IEEE Transactions on Systems, Man, and Cybernetics, Sep./Oct. 1983, pp. 834–846.

A. G. Barto, et al., Associative Search Network: A Reinforcement Learning Associative Memory, 40 Biological Cybernetics, 1981, pp. 201–211.

Primary Examiner—Allen MacDonald
Attorney, Agent, or Firm—A. C. Smith

[57] ABSTRACT

A graded-learning processing network which grades its performance as it maps the input-output relationship during a training period. At the end of an operation of the Processing Newtork, its performance is graded and network variables are adjusted or amended, and the processing network is operated again and its performance is graded. The order or direction of performance grades (e.g. better or worse) are noted and the adjustments or amendments of the processing network may proceed in the same direction (or opposite direction) depending upon the grading of subsequent performances. This obviates the need for information about a desired response on output performance of the processing network at any given time, and is conducive to efficient learning for improved performance in a processing environment in which the operational parameters are not known.

14 Claims, 6 Drawing Sheets

Figure 2c $$GRADE = \sum_{i=0}(A\theta^2 + BX^2) + CT$$

WHERE A, B, C ARE CONSTANTS

GRADED LEARNING DEVICE AND METHOD

FIELD OF THE INVENTION

This invention relates to adaptive information processing methods and systems and more particularly to methods and devices based upon neural network technology in which the desired output need not be known in order to train the device for improved subsequent performance.

BACKGROUND OF THE INVENTION

Adaptive devices capable of learning input-output relationships have, for the most part, been restricted to the case of supervised training in which, for each input, the desired output is known. For many situations where adaptive learning of an input-output relationship is required, the desired output is not known for each individual input. However, it is often possible to monitor available information in the operating environment and from this information derive a score or grade that measures performance of an adaptive device over multiple sets of inputs. The adaptive device can then use this grade as the basis for improving its performance over a sequence of trial performances. In the past, such adaptive devices capable of reinforcement training have been restricted to either the learning of relatively simple classical conditioning relationships or to the adaptive development of lookup table input-output relationships.

It is an objective of the present invention to overcome these limitations and provide graded learning method and deice that can learn an arbitrary input-output relationship using an arbitrary grade.

SUMMARY OF THE INVENTION

In accordance with the present invention, a graded-learning processing network grades its performance as it maps the input-output relationship during a training period. At the end of an operation of the Processing Network, performance graded and network variables are adjusted or amended, and the processing network is operated again and its performance is graded. The order or direction or performance grades (e.g. better or worse) are noted and the adjustments or amendments of the processing network may proceed in the same direction (or opposite direction) depending upon the grading of subsequent performances. This obviates the need for information about a desired response on output performance of the processing network at any given time, and is conducive to efficient learning for improved performance in a processing environment in which the operational parameters are not known.

DESCRIPTION OF THE DRAWINGS

"FIGS. (2a)–(c) comprise" a pictorial diagram illustrating the interaction of the processing network of FIG. 1 with an exemplary process environment.

DESCRIPTION OF THE PREFERRED EMBODIMENT

Figure 1:
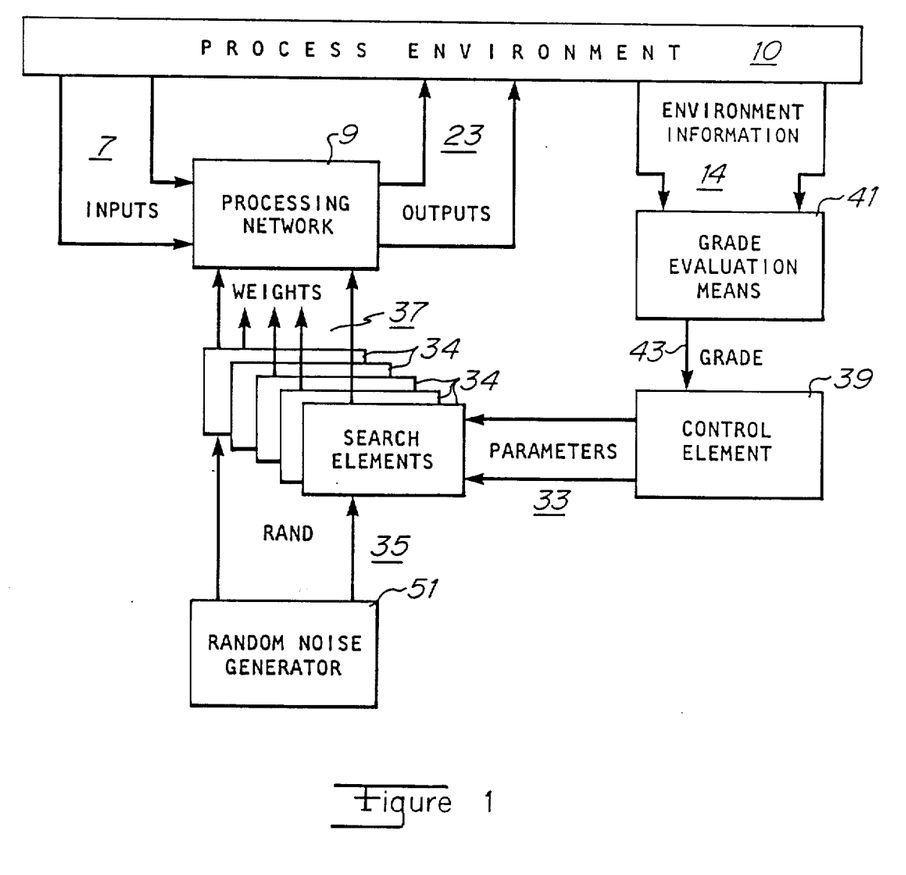
FIG. 1 is a block schematic diagram of a processing network or device according to one embodiment of the present invention.
Figure 2A:
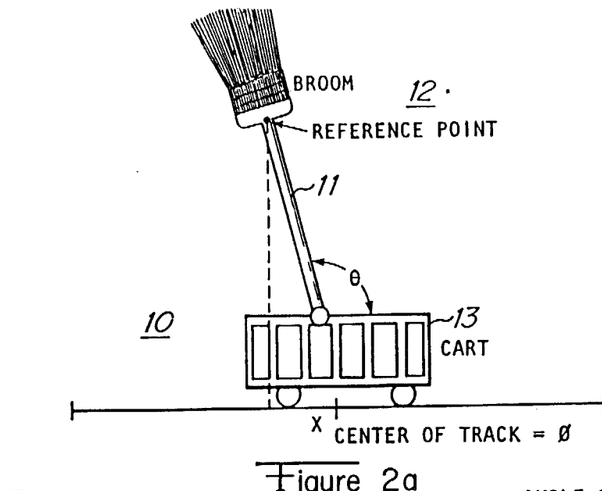
Figure 2B:
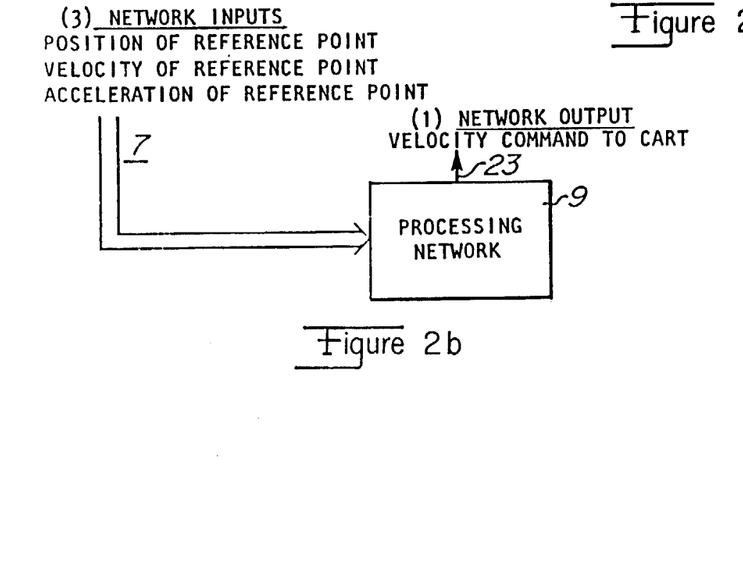
Figure 2C:
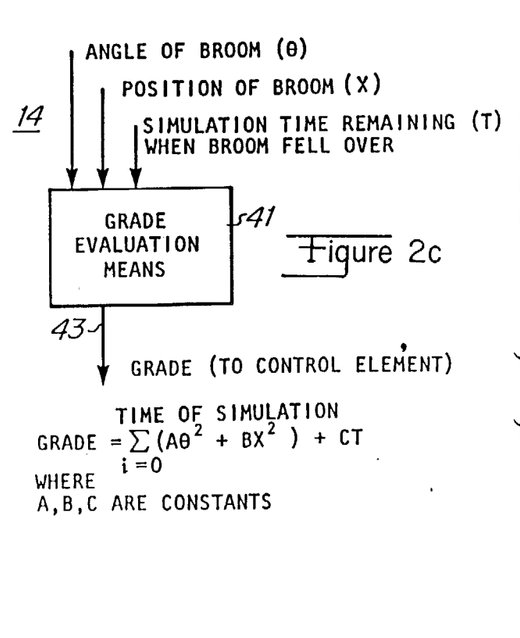
Figure 3:
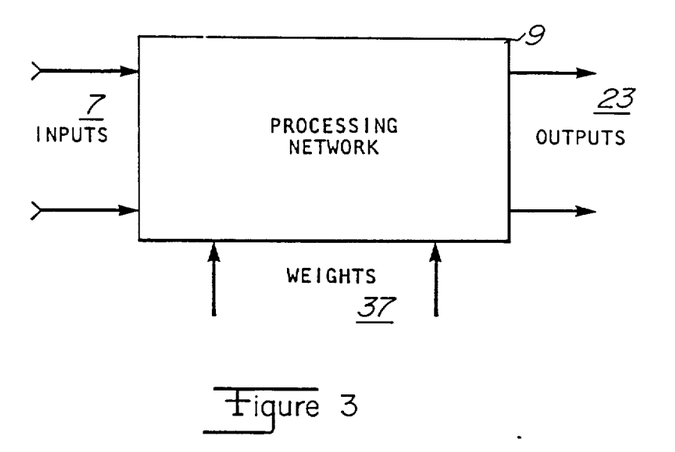
FIG. 3 is a block diagram of the processing network of FIGS. 1 and 2.
Figure 4:
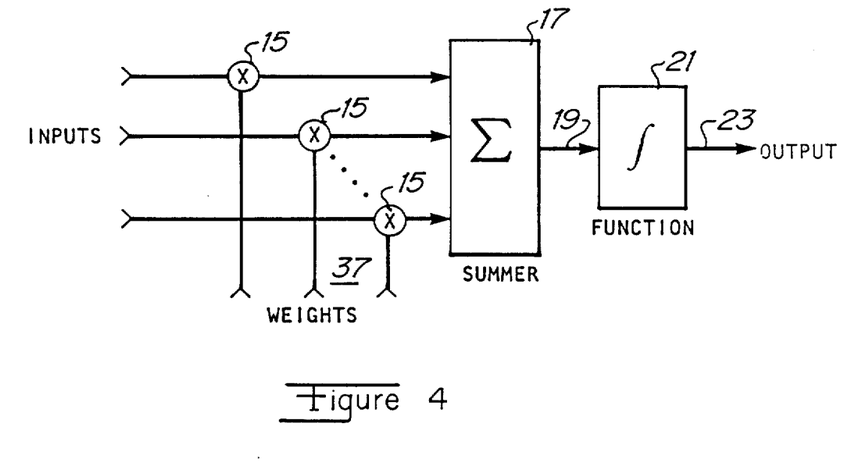
FIG. 4 is a block diagram of one embodiment of a processing element according to the present inventions.

The graded learning device and method of the present invention is described herein in general terms and with reference to specific embodiments or exemplary applications for ease of understanding. Therefore, with reference to FIGS. 1 and 2 there are shown, respectively, a block schematic diagram of one embodiment of the graded learning device of the present invention, and a pictorial diagram of a typical processing environment associated with an exemplary pole-balancing application of the present invention. For purposes of discussion, the embodiment of the graded learning device illustrated in FIG. 1 may be described in connection with operation in the processing environment 10 of a pole 11 that is to be balanced on a movable cart 13 at the center of a track where no information about the parameters of the system is available from which an analytical solution may be calculated. In this embodiment, the device is configured to include the processing network 9 which includes an arbitrary number of processing elements, as illustrated in FIG. 4 later described herein, which are arranged within several layers or slabs. The inputs 7 to the processing network 9, for example as illustrated in FIGS. 1, 2 and 3, may in general include analog or digital signals from the processing environment 10. In the example, these inputs are representative of position of a reference point 12 on the pole 11, velocity of this a reference point, and acceleration of the reference point. The output of the processing network 9 may in general be analog or digital signals to the processing environment 10. In the example, the output is a velocity command to a motor driving the cart 13. The processing elements, as illustrated in FIG. 4, may also be interconnected to receive inputs from other processing elements in the processing network 9.

As illustrated in FIG. 4, input signals to a processing element are each multiplied 15 and summed 17 and the weighted sum 19 is supplied to a function element 21 which includes a linear or non-linear function such as a sigmoid function, and which produces the output 23 (from each such processing element). One possible form of the signoid function is $f(x) = (2/(1+e^{-x})) - 1$. Such outputs 23 may be supplied to other inputs of other processing elements inside of the processing network 9, and may be supplied outside the processing network 9 to the process environment 10. In one embodiment of the present invention, the output from each processing element in the processing network 9 is connected to the inputs of all the other processing elements in the network (not shown for clarity) to form a fully-interconnected network. Of course, other networks of processing elements could be formed as an alternative to the fully interconnected network within the processing network 9. For example, the processing elements may be arranged in layers with the first layer connected only to the inputs 7 and with the next layer connected to the outputs of the first layer, and so on, to form a so-called 'feed-forward network'.

Figure 5:
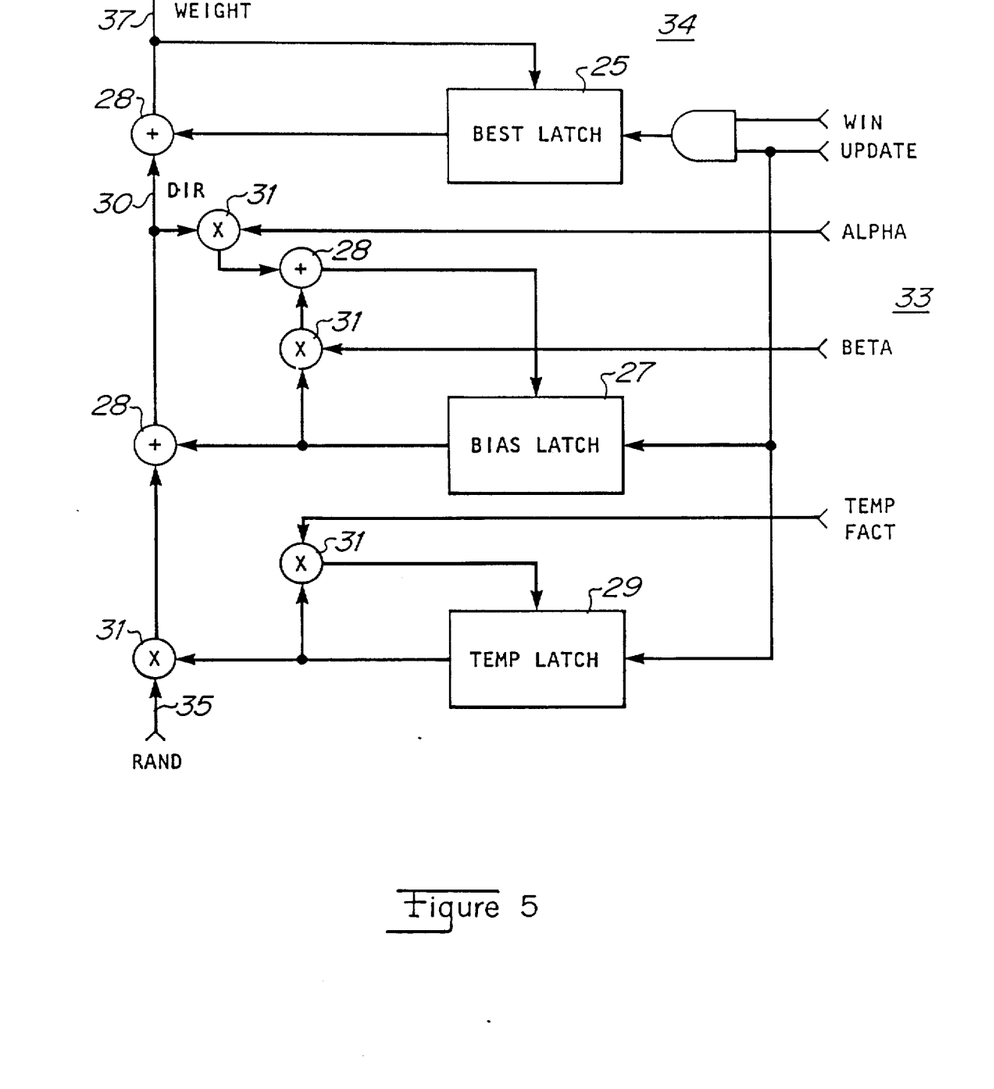
FIG. 5 is a block diagram of a search element in the illustrated embodiment of FIG. 1.
Figure 6:
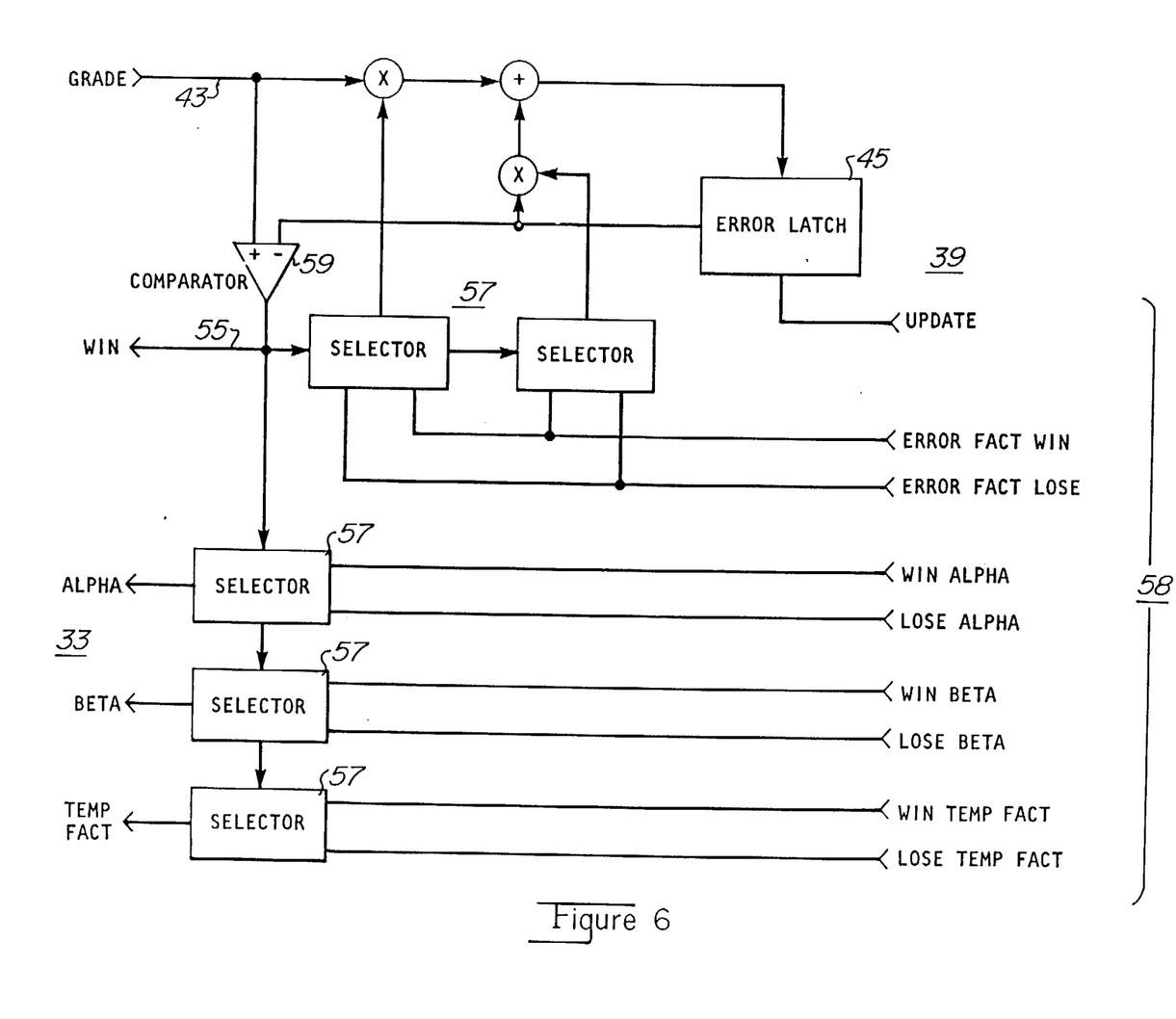
FIG. 6 is a schematic diagram of a control element in the illustrated embodiment of FIG. 1.

In one embodiment of the present invention, the graded learning process is performed using search elements 34, as illustrated in the block schematic diagrams of FIGS. 1 and 5. The search element 34 in schematic form illustrates the transfer of voltages or digital signals between elements. There are three basic types of circuit operations involved in the search elements 34. The latches 25, 27, and 29 hold a signal which can be changed upon receipt of an update command, and the additive elements 28 and multiplicative elements 31, respectively add or multiply applied inputs to produce the resultant 'weight' output 37 of that search element. These search elements 34 receive a series of control parameters 33 and a random-number input 35 to produce 'weight' outputs 37 for application to the multipliers 15 in the processing elements of FIG. 4. The control parameters 33 are derived from the control element 39 under control of the grade (or performance) evaluation means 41, as illustrated in FIGS. 1, 2 and 6. The grade evaluation means 41 receives its inputs from the processing environment 10. In the example, these inputs may include angle of the pole 11, position of the pole 11 relative to the center of the track, and processing time, for example, to when the Pole falls over The grade evaluation means 41 may be specific to the particular processing environment 10, but may include conventional circuitry for evaluating the applicable inputs for producing therefrom an output signal 43 that is representative of resultant performance of the present invention within the particular processing environment 10. The control element 39, as illustrated in the block schematic diagram of FIG. 6 later described herein, therefore produces the parameters 33 which, in turn, operate the search elements 34 to produce the 'weight' outputs 37 for application to the multipliers 15 within the processing elements illustrated in FIG. 4.

Generally, then, the graded learning device of the present invention operates initially in response to inputs 7 from the processing environment 10 (for example, angle, position and velocity information about a reference point 12 on the pole 11) to produce an output 23 to control the process environment 10 (for example, pulse rate to a stepping drive motor on cart 13), and receives a grade 43 on performance (for example, how well and how long the pole was balanced near the center of the track). Therefore, the device learns information from the process environment 10, receives a grade 43 for its performance, and that grade is evaluated in terms of the current set of weights 37 being supplied to the processing network 9. The grade has the characteristic that it is completely dependent upon, (i.e. is a resultant of) the current set of weights such that if any of the weights are changed, there would be a corresponding change in the grade. However, the exact relationship between weights and the grade 43 for performance need not be known. Instead, the search elements 34 function to find combinations of weights that yield the best possible grade. When a 'good' set of weights is found, those weights from the search elements 34 are saved in the "best latches" 25 to represent the best weights that yield the best performance grade thus far. In addition, the "error latch" 45 in the control element of FIG. 6 retains the value of that best grade. Thereafter, the "weights" 37 are changed by the search elements 34, as illustrated in the embodiment shown in FIG. 5, in response to the random input 35 and such new weights are supplied to the processing network 9. The processing network 9 then received inputs 7 and generates outputs 23 to control or otherwise manipulate the process environment 10 for some fixed interval of time, called the 'simulation time period'. During that period, environmental information 14 received from the process environment 10 is supplied to the grade evaluation means 41 which processes the information to produce the grade 43 that indicates how well the processing network 9 is performing in the processing environment 10. For certain applications the grade itself may be supplied as an environmental information input. By this procedure, a set of weights is formed for which the processing network 9 Performs better than with another set of weights, and that best-set of weights is stored in the 'best latch' 25 of each search element 34. In addition, the change that was made from the prior value of the best set of weights is also stored in the bias latch 27 in each search element 34 so that the direction signal 30 is generated from the output of the bias latch 27 and from the output 35 of random number generator 51. The random value generator 51 supplies random values to all the search elements 34 so that new sets of weights can be tried that haven't been tried before. There is a "temperature" or an activity level associated with the randomness of values generated by the generator 51 (e.g., higher temperature = more widely random steps) and that temperature is controlled by a temperature factor 53 at each update. An update occurs at the end of each manipulation of the process environment 10 (i.e., at the end of each simulation time period), and that temperature factor may be set for wide or narrow random value variations, depending upon how the user desires to set such factors to establish certain desired learning characteristics.

In operation, a random new set of weights 37 is established upon update, together with the directions of the changed weights. The new weights 37 are supplied to the processing network 9 which performs another manipulation of the processing environment 10 and is graded on performance as having performed either better or worse. If the performance was worse (i.e. lower or poorer grade 43), the bias latch 27 is changed based upon what the stored bias was and upon what the current direction 30 was. The direction 30 is simply the summation of the stored bias and the random number supplied to the search element 34. Each search element 34 is therefore able to develop preferred changes in that if it finds that a change in the weight in a certain direction yields a better grade, the search element 34 continues to change the weight in that direction to yield a better grade.

Referring now to FIG. 6, the control element 39 responds to the input grade 43 and stores the best grade in the error latch 45. That grade can slowly decay with subsequent operations if there is randomness in the process environment 10. For this purpose, a network of interconnections is provided, as illustrated in the embodiment of FIG. 6, between the grade input 43 and the error latch 45. The grade (or 'error' as the difference between absolute best grade and the grade at input 43) currently saved in the error latch 45 and the input grade 43 determine whether the incoming grade from the process environment 10 is actually better than the previously attained grade stored in the error latch 45 (as a 'win' condition), or is poorer than previously attained and stored in the error latch 45 (as a 'lose' condition). On a win condition, the factors that control the associated search element 34 including the alpha, beta and temperature factors 33 are changed and, with the win factor 55, are supplied to the search element 34 so that the best latch 25 can be updated with the weight that was associated with producing the new, better grade.

The input parameters 58 are set by the user to establish the learning characteristics of the device.

The selectors 57 can either be switches or multiplexors, or the like, that respond to the output of the comparator 59 for selecting either the win or the lose input parameters 58 to be supplied (via the selectors 57) as the associated parameters 33 to the respective search elements 34. The search elements 34 all have the same configuration and are each weighted individually in the device in this manner so that there is one search element for each weight in the processing network 9. There is essentially no limit to the number of search elements 34 that can be included with the processing network 9, and the typical number may be of the order of hundreds or thousands. Only one control element 39 is required to handle the selection of the parameters 33, and only one grade evaluation means 41 is required to assess the performance in the process environment 10. Of course, the exemplary pole-balancing application in the process environment 10 may include a cart 13 that is movable along two coplonar axes, with a processing network 9 and grade evaluation means 41 and associated circuitry of the type described above operating independently on each axis.

In the operation of the present invention in the exemplary processing environment 10 illustrated in "FIGS. 2(a) and (c)" the cart 13 can move on a fixed track with the pole 11 fixed in a pivot (for one-axis explanation). The cart 13 starts from initial conditions and must execute velocity commands 23 supplied thereto to move the cart in one direction or the other in order to maintain the pole 11 in balance at the center of the track. In this process environment 10, the network of the present invention tries to learn to control the velocity of the cart 13 in order to keep the pole 11 upright at the center of the track. To accomplish this, three inputs are supplied to the processing network 9 and one output 23 is supplied from the processing network 9 to the cart 13. The inputs are: (1) the position of a reference point on the pole 11 relative to the center of the track; (2) the velocity of that reference point; and (3) the acceleration of that reference point. These inputs may be derived in conventional manner, for example, from position, velocity and acceleration encoders, respectively, or from a digitized video image of the pole 11 on the cart 13 that is driven by a stepper motor. The output 23 of the processing network 9 is a velocity command to the cart 13 in the form of direction and number of pulses per second that should be applied to the stepping motor, and such command is executed by conventional circuitry for driving the stepping motor to move the cart 13. In order for the device of the present invention to operate effectively, it is necessary to establish a grade for a given simulation time period. The pole 11 and cart 13 start from a starting point which is consistent in each run so that the initial conditions are constant. Operation therefore starts from the same initial conditions in each simulation run and the simulation run will be for a fixed period of time (e.g. fifteen seconds). In order to establish a grade of performance, information is derived from the Pole 11, namely: (1) the angle the pole 11 from upright; (2) the position of the pole reference Point 12 along the track; and (3) in the case where the pole fell over, the amount of time remaining in the simulation run. Those inputs are supplied to the grade evaluation means 41 of the network. The grade evaluation means 41 may operate on the applied inputs with any arbitrary function that the user wishes to establish, for example, the integration over the simulation time period of the errors from upright position (i.e. angle), and the distance traveled from the center of the track, and in the case that the pole 11 fell over, the time remaining in the simulation time period.

Figure 7:
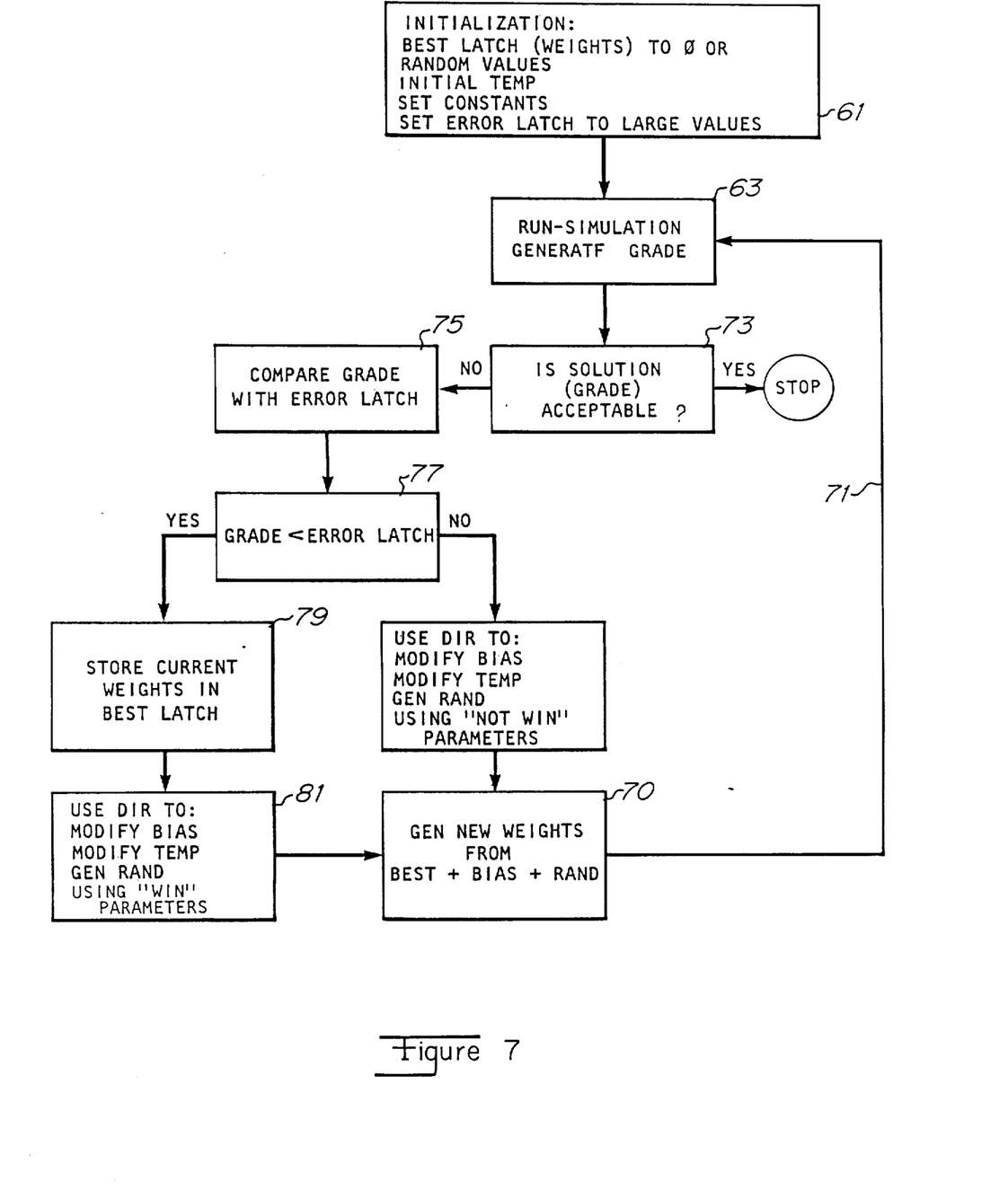
FIG. 7 is a flow chart illustrating the operation of the present invention through the training process.

Referring now to FIG. 7, there is shown a flow diagram of the operation of the Present invention in a typical training process within the process environment 10. One initial operating condition 61 would be to start with zero's or random values in all the weights of the processing network 9 and with a zero bias (i.e. no preferred direction of change) for operation in an initial simulation time period. This would represent that the processing network 9 in essence does nothing during initial run simulation or operation 63 in order to establish a baseline error or grade for how long it takes the pole 11 to fall over, and to develop a grade 43 in the grade evaluation means 41 that is representative of the processing network 9 doing nothing. That grade is set into error latch 65, and the constants for the device including the Alphas and the Betas 33, 58 are supplied Typical values 58 that may be supplied by the user include:

Error factor WIN $= 1.0$
Error factor LOSE $= 0.0$
WIN alpha $= 0.8$
LOSE alpha $= 0.9$
WIN beta $= 0.25$
LOSE beta $= -0.01$
WIN Temp. factor $= 1.01$
LOSE Temp. factor $= .995$ After grading the initial run and establishing the constants, an update pulse is sent 67 to the network control elements 39 and to the search elements 34 to establish a new set of weights in the processing network 9. With these new sets of weights, the process environment 10 operates again 69, with a certain performance that yielded either a better grade 43 or a poorer grade. The update pulse is supplied to initiate another graded learning iteration 71 including establishing new weights 70 based in part upon the results of the previous performance, and upon the results of the best run to date. After a simulated run or operation in the process environment, the grade is evaluated to determine whether the combination of the best weights was an acceptable solution 73. Alternatively, the learning improvements may be stopped when the temperature factor is below a certain value, or after executing a selected number of cycles of operation or simulation and updates, or after determining that the best weights are in place and there was no need to continue refining the weights. Upon executing an update, the present grade is compared 75 with the value in the error latch 45, which grade is either more or less 77 than the value in the error latch 45. This determines whether to store 79 the current weights in the best latches 25 or not. If the performance improved as indicated by a better grade, and the processing network therefore improved, then in addition to storing the current weights in the best latches 25, a new direction is also established 81 for continued search for improvement. The values in the bias latches 27 and the temperature factors in temperature latches 29 are amended or modified, and a new random number is supplied to the input of the search element 34 in order to generate new weights (based on the combination of the best bias and the new random input) Prior to another operation of the processing environment 10. Subsequent operation and the subsequent graded result can further upgrade performance in the manner described. Therefore, the weights in the processing network of the present invention are altered from initial values (e.g. zero or random values) as a result of graded performance in the process environment 10, and the graded learning selected the best weights and determined the preferred directions of change in response to successive operations and gradings of performance in the processing environment 10.

In the illustrated embodiment of the present invention, a direction for change may be selected arbitrarily and operation or simulation in the process environment 10 is graded again. If the performance was graded better, then the weights and values are stored and the directions of changes are retained so that subsequent trial changes are made in the same direction in an effort to further improve the grade of performance in a subsequent simulation. The bias indicating the direction of improved change is updated from the prior direction of change (if different) based upon a random input. Subsequently, weight changes will continue to be made in the new direction as long as the performance grade continues to improve in successive simulations or operations in the process environment 10. In addition, some randomness is introduced into the size of a change so that the changes are not generally in linear increments. This contributes an element of experimentation in that a new random weight in the bias direction may yield an unexpected performance, or avoid an anomalous performance at an intermediate weight which would otherwise have been established using orderly, incremental step changes. Of course, such experiment can either succeed or fail, as indicated by the grade of performance in a successive simulation. If each cycle of graded learning and simulation yields improved grades, the bias is enhanced by the fact that performance is improving and larger steps of change in the bias direction may be justified as long as the performance grade improves. The temperature factor is increased to add more randomness to the graded learning process. Eventually, a succession of simulations and changes with bias direction will yield a poorer performance grade than previously obtained. This causes a change in bias 83 based on the 'failure' of the experimental change by subtracting the current direction from the best solution so far. This subtraction from the bias indicates that the current direction of change may not be good, or at least is less good, so the bias for changes in the certain direction is lowered, or even reversed. Thus, if changes in weights in the selected direction which yielded improvements in performance grade eventually yield poorer grade, the bias will change to produce weight changes in another (opposite) direction. Some random-size steps of weight changes in some other direction will therefore result. The graded learning operation of the present invention therefore simulates a trial-and-error scheme of solving a problem in that continually-improved Performance justifies further experimental changes in the preferred direction, while resulting poorer performance justifies experimental changes in another direction.

The bias described above indicates which way is 'down hill' (i.e., along negative slope of improvement). This enables the present invention to take advantage of an established direction of change for improved performance and can seek optimum conditions for best performance grade much more efficiently. This aspect of the present invention is particularly advantageous in process environments 10 in which the operational elements have not been, or cannot be, adequately characterized or modeled, or in which dominant randomness (e.g. windage, non-linearities, etc) exists. In contrast, numerical analysis of a process environment which is adequately characterized or modeled permits predictable changes in weights to be made by analytical solution, with the knowledge of which way to change the weights. Graded learning in the present invention, however, relies instead upon the randomness of weight changes and upon storage of the information indicative of the changes that yielded improved performance grades.

Referring now to the parameters supplied to the network of the present invention, generally the temperature factor should increase when performance grade is improving and should decrease when the performance grade is diminishing so that less randomness is involved in setting new weight changes under conditions of poorer performance grades. Thus, around the current solution, there is expected to be negative-slope (i.e. downhill) Performance improvement in grade, unless the optimal solution of weights has been attained. Big-step changes occur until performance grades deteriorate, at which time the biasing factors successively decrease toward zero or until performance grades improve again. In addition, the temperature factor decreases to narrow the changes until some improvement in performance grade is attained. The step changes thus tend toward progressively smaller steps if successive simulations fail to find a good combination of weights, until eventually a better solution just a small step away in a selected direction from current weights and values yields an improved performance grade. Then, in response to detecting improved performance grade by the small step change in the right direction, the bias also changes to make larger step changes that continue to yield improved performance grades in a manner analogous to gathering speed and momentum 'down the hill' toward the best solution until passing the best solution and returning with decreased temperature factor and smaller step changes until improved performance grade is realized, and so on. In the exemplary processing environment 10, this operation of the present invention is manifested by learning to balance the pole 11 without modelling or otherwise deriving the control laws associated with operation of the pole 11 and cart 13, and is in contrast to executing an analytical solution of how to balance the pole 11. Thus, in an actual physical environment, the operational parameters may be substantially different from calculated parameters, or are otherwise not conducive to convenient analytical solution, and in such environment, the present invention operates to find the best possible solution (or at least a better solution than can be found by analytical techniques).

Therefore, the graded learning device and method according to the present invention differs from other adaptive devices in that the desired or expected output of the device need not be known in order to train the device, as long as some measure of the overall performance of the device can be supplied.

What is claimed is:

1. Adaptable circuitry capable of improving operation in association with an arbitrary process environment, the circuitry comprising:
   a processing network including a plurality of processing elements connected to receive input signals from the process environment for producing output signals therefrom in accordance with controllable transfer functions for controlling the operation of the process environment;

grading means capable of utilizing an arbitrary grading function responsive to the operation of the process environment for producing a grade signal indicative of the quality of operation of the process enviroment under control of said output signals;

generator means for producing random signals;

search means responsive to the grade signal, and to past transfer function alterations, to the random signal for selectively altering the transfer functions of the processing elements to modify the output signals supplied to the process environment with respect to the input signals received therefrom.

2. Adaptable circuitry according to claim 1 wherein said search means produces an output for altering the transfer function of the associated process element as the combination of a grade signal and the random signal.

3. Adaptable circuitry according to claim 1 wherein said search means includes search circuitry for each process element that comprises storage means for storing a grade signal and comparator means connected to the storage means for comparing a subsequent grade signal to the stored grade signal to alter the transfer function of the associated process element only in response to the subsequent grade signal exceeding the stored grade signal.

4. Adaptable circuitry according to claim 3 wherein said search means produces an output for altering the transfer function of the associated process element in response to a subsequent grade signal exceeding the stored grade signal as the combination of such subsequent grade signal and the random signal.

5. Adaptable circuitry according to claim 4 wherein the range of variations of the random signal is changed in response to a subsequent grade signal for altering the magnitude of variation of the transfer function of the associated process element with improving grade signal.

6. Adaptable circuitry according to claim 5 wherein said range increases in response to said subsequent grade signal exceeding the stored grade signal for increasing the magnitude of variation of the transfer function of the associated process element with improving grade signal.

7. Adaptable circuitry according to claim 3 wherein said search means includes auxiliary storage means for storing signal therein indicative of the direction of change of the transfer function of the associated process element; and comprises circuit means coupled to the auxiliary storage means for altering the signal stored therein in response to a subsequent grade signal not exceeding the stored grade signal.

8. A method of attaining improvements in performance in an arbitrary process environment comprising the steps of:

forming input signals indicative of operating characteristics of the process environments;

forming output signals as controllable transfer functions of the input signals to control operation of the process environment in response thereto;

producing a grade from an arbitrary grading function which is indicative of quality of the operation of the process environment under control of the output signals;

generating a random signal;

responding to the grade, and to past alterations of the transfer functions, and to the random signal for selectively altering the transfer functions to modify the output signals supplied to the process environment with respect to the input signals received therefrom.

9. The method according to claim 8 wherein in the step of responding, the transfer function is altered as the logical combination of the grade and the random signal.

10. The method according to claim 8 wherein in the step of responding, an initial grade is stored and a subsequent grade is compared with the stored grade for altering the controllable transfer function only in response to a subsequent grade exceeding the stored grade.

11. The method according to claim 10 wherein in the step of responding, the transfer function is altered in response to a subsequent grade exceeding the stored grade as the logical combination of such subsequent grade and the random signal.

12. The method according to claim 11 wherein the range of variations of the random signal changed in response to a subsequent grade for altering the magnitude of alteration of the transfer function with improving grade.

13. The method according to claim 12 wherein said range is increased in response to a subsequent grade exceeding the stored grade for increasing the magnitude of alteration of the transfer function with improving grade.

14. The method according to claim 10 wherein in said step of responding, an indication of the direction of change of the transfer function is stored, and the stored indication is altered in response to a subsequent grade not exceeding the stored grade.

* * * * *